(12) United States Patent
Shimizu et al.

(10) Patent No.: US 8,396,130 B2
(45) Date of Patent: Mar. 12, 2013

(54) MOTION VECTOR SEARCH METHOD AND APPARATUS, PROGRAM THEREFOR, AND STORAGE MEDIUM WHICH STORES THE PROGRAM

(75) Inventors: Atsushi Shimizu, Yokosuka (JP); Ryuichi Tanida, Yokosuka (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 520 days.

(21) Appl. No.: 12/527,374

(22) PCT Filed: Mar. 5, 2008

(86) PCT No.: PCT/JP2008/053937
§ 371 (c)(1),
(2), (4) Date: Aug. 14, 2009

(87) PCT Pub. No.: WO2008/111451
PCT Pub. Date: Sep. 18, 2008

(65) Prior Publication Data
US 2010/0111184 A1    May 6, 2010

(30) Foreign Application Priority Data
Mar. 14, 2007  (JP) .................................. 2007-064286

(51) Int. Cl.
H04N 7/12 (2006.01)
H04N 11/02 (2006.01)
H04N 11/04 (2006.01)
(52) U.S. Cl. ................................. 375/240.16
(58) Field of Classification Search ............... 375/240.16
See application file for complete search history.

(56) References Cited

U.S. PATENT DOCUMENTS
5,086,488 A   2/1992 Kato et al.
5,283,646 A   2/1994 Bruder
(Continued)

FOREIGN PATENT DOCUMENTS
EP   0 424 060 A2   4/1991
EP   0 757 490 A2   2/1997
(Continued)

OTHER PUBLICATIONS

MPEG-2, Test Model 5 (TM5), Doc.ISO/IECJTC1/SC29/WG11/NO400, Test Model Editing Committee, pp. 59-63, Apr. 1993.

(Continued)

*Primary Examiner* — Christopher S Kelley
*Assistant Examiner* — Hee-Yong Kim
(74) *Attorney, Agent, or Firm* — Harness, Dickey & Pierce, P.L.C.

(57) ABSTRACT

A motion vector search method used in video encoding which performs motion-compensated prediction. The method includes inputting a motion vector which has been searched for with respect to an encoding target block; computing a motion vector having a minimum overhead cost which minimizes the amount of code generated for the motion vector of the encoding target block; limiting a search area based on the input motion vector and the motion vector having the minimum overhead cost; and searching for a motion vector by searching only the limited search area. It is possible to compute a predicted vector of the encoding target block based on a motion vector of an already-encoded block in the vicinity of the target block, and determine the computed predicted vector to be the motion vector having the minimum overhead cost.

9 Claims, 10 Drawing Sheets

U.S. PATENT DOCUMENTS

| | | | |
|---|---|---|---|
| 5,398,068 A | 3/1995 | Liu et al. |
| 5,398,078 A | 3/1995 | Masuda et al. |
| 5,760,836 A | 6/1998 | Greenfield et al. |
| 5,781,237 A | 7/1998 | Fukuda |
| 5,832,128 A | 11/1998 | Suzuki |
| 5,835,145 A | 11/1998 | Ouyang et al. |
| 6,148,029 A | 11/2000 | Fert |
| 6,173,012 B1 | 1/2001 | Katta et al. |
| 6,414,995 B2 | 7/2002 | Okumura et al. |
| 6,480,544 B1 | 11/2002 | Uehara et al. |
| 6,498,810 B1 | 12/2002 | Kim et al. |
| 6,546,050 B2 | 4/2003 | Ramaswamy |
| 6,567,554 B1 | 5/2003 | Sugahara et al. |
| 6,798,837 B1 | 9/2004 | Uenoyama et al. |
| 6,859,496 B1 | 2/2005 | Boroczky et al. |
| 6,963,608 B1 | 11/2005 | Wu |
| 7,042,943 B2 | 5/2006 | Haskell et al. |
| 7,197,072 B1 | 3/2007 | Hsu et al. |
| 7,953,154 B2 * | 5/2011 | Murakami et al. ........ 375/240.16 |
| 2002/0122482 A1 | 9/2002 | Kim et al. |
| 2003/0043917 A1 | 3/2003 | Bublil et al. |
| 2003/0095594 A1 | 5/2003 | Laksono et al. |
| 2003/0112872 A1 | 6/2003 | Park et al. |
| 2004/0120404 A1 | 6/2004 | Sugahara et al. |
| 2004/0126028 A1 | 7/2004 | Adachi et al. |
| 2004/0197024 A1 | 10/2004 | Bobichon et al. |
| 2005/0036698 A1 | 2/2005 | Beom |
| 2005/0063468 A1 | 3/2005 | Shimizu et al. |
| 2005/0066318 A1 | 3/2005 | Chujoh et al. |
| 2005/0078748 A1 | 4/2005 | Moni et al. |
| 2005/0152450 A1 | 7/2005 | Ueno et al. |
| 2005/0159946 A1 | 7/2005 | Chen et al. |
| 2005/0175093 A1 | 8/2005 | Haskell et al. |
| 2005/0207493 A1 | 9/2005 | Kobayakawa |
| 2005/0243930 A1 | 11/2005 | Asano et al. |
| 2006/0072666 A1 | 4/2006 | Cho et al. |
| 2006/0126732 A1 | 6/2006 | Pian et al. |
| 2006/0153293 A1 | 7/2006 | Hsu et al. |
| 2006/0159357 A1 | 7/2006 | Mizuno |
| 2006/0171457 A1 | 8/2006 | DeGarrido et al. |
| 2006/0176953 A1 | 8/2006 | Mohsenian |
| 2006/0209965 A1 | 9/2006 | Tseng |
| 2006/0222074 A1 | 10/2006 | Zhang |
| 2006/0251172 A1 | 11/2006 | Kim |
| 2007/0009045 A1 | 1/2007 | Mohandas |
| 2007/0071094 A1 | 3/2007 | Takeda et al. |
| 2007/0296613 A1 | 12/2007 | Hussain et al. |
| 2009/0168884 A1 * | 7/2009 | Lu et al. ................... 375/240.16 |
| 2010/0014583 A1 | 1/2010 | Shimizu et al. |

FOREIGN PATENT DOCUMENTS

| | | |
|---|---|---|
| EP | 0 773 688 A2 | 5/1997 |
| EP | 1032213 A2 | 8/2000 |
| EP | 1120976 A1 | 8/2001 |
| EP | 1182888 A2 | 2/2002 |
| EP | 1 274 253 A2 | 1/2003 |
| EP | 1662801 A1 | 5/2006 |
| JP | 04-150284 A | 5/1992 |
| JP | 04-298184 A | 10/1992 |
| JP | 05-328333 A | 12/1993 |
| JP | 6-113271 A | 4/1994 |
| JP | 6-237448 A | 8/1994 |
| JP | 7-203430 A | 8/1995 |
| JP | 7-0264579 | 10/1995 |
| JP | 08-009379 A | 1/1996 |
| JP | 08-9379 A | 1/1996 |
| JP | 08-009397 A | 1/1996 |
| JP | 8-116448 A | 5/1996 |
| JP | 9-098427 A | 4/1997 |
| JP | 10-126792 A | 5/1998 |
| JP | 10-290461 A | 10/1998 |
| JP | 11-55671 A | 2/1999 |
| JP | 11-196424 A | 7/1999 |
| JP | 11-239354 | 8/1999 |
| JP | 11-252572 A | 9/1999 |
| JP | 2000-023162 A | 1/2000 |
| JP | 2000-138938 A | 5/2000 |
| JP | 2000-201328 A | 7/2000 |
| JP | 2000-244921 A | 9/2000 |
| JP | 2000-261799 A | 9/2000 |
| JP | 2002-010260 A | 1/2002 |
| JP | 2002-247587 | 8/2002 |
| JP | 2004-64725 A | 2/2004 |
| JP | 2004-134896 A | 4/2004 |
| JP | 2004-166088 A | 6/2004 |
| JP | 2005-45736 A | 2/2005 |
| JP | 2005-073245 A | 3/2005 |
| JP | 2005-102170 A | 4/2005 |
| JP | 2005-295526 A | 10/2005 |
| JP | 2005-318296 A | 11/2005 |
| JP | 2005-318468 A | 11/2005 |
| JP | 2006-005466 A | 1/2006 |
| JP | 2006-506032 A | 2/2006 |
| JP | 2006-203437 A | 8/2006 |
| JP | 2006-270683 | 10/2006 |
| JP | 2006-295535 A | 10/2006 |
| RU | 2 123 769 C1 | 12/1998 |
| RU | 2 127 962 C1 | 3/1999 |
| RU | 2 137 194 C1 | 9/1999 |
| RU | 2 210 817 C2 | 8/2003 |
| RU | 2 277 761 C2 | 7/2004 |
| RU | 2004 125 588 A | 1/2006 |
| SU | 1649674 A1 | 5/1991 |
| TW | 1256259 B | 6/2006 |
| TW | 200629911 A | 8/2006 |
| WO | WO-01/10135 A1 | 2/2001 |
| WO | 03/084242 A2 | 10/2003 |
| WO | WO-2006/006564 A1 | 1/2006 |
| WO | 2006/096869 A2 | 9/2006 |

OTHER PUBLICATIONS

Sakae Okubo, Shinya Kadono, Yoshihiro Kikichi, and Teruhiko Suzuki, "H.264/AVC Textbook", Impress, pp. 144-146, 2004.

CABAC: Detlev Marpe, Heiko Schwarz, Thomas Wiegand, "Context-Based Adaptive Binary Arithmetic Coding in the H.264/AVC Video Compression Standard", IEEE Transactions on Circuits and Systems for Video Technology, vol. 13, No. 7, pp. 620-636, Jul. 2003.

Edited by the Institute of Television Engineers of Japan, Sogo Multimedia Sensho MPEG, 1st edition, Ohmsha, Ltd., Apr. 20, 1996, pp. 110 to 113, 5-5 Rate Seigyo to Buffer Seigyo 1 Bit Haibun, Rate Seigyo to Tekioryosika (1) Step 1.

Sullivan, Gary J., et al., "Rate-Distortion Optimization for Video Compression," IEEE Signal Processing Magazine, Nov. 1998, pp. 74-90, vol. 15, No. 6.

Vetro, Anthony, et al., "MPEG-4 Rate Control for Multiple Video Objects," IEEE Transactions on Circuits and Systems for Video Technology, Feb. 1999, pp. 186-199, vol. 9, No. 1.

Yin, Ming, et al., "A Rate Control Scheme for H.264 Video Under Low Bandwidth Channel," Journal of Zhejiang University Science A, Jun. 2006, pp. 990-995, vol. 7, No. 6.

Richardson, Iain, "H.264 and MPEG-4 Video Compression: Video Coding for Next Generation," Moscow: Tekhnosfera, 2005, pp. 55-65, 228-240 (pp. 33-42, 172-184 of translation).

Yi, Xiaoquan, et al., "Improved and simplified fast motion estimation for JM," Joint Video Team (JVT) of ISO/IEC MPEG & ITU-T VCEG, JVT-P021, 16th Meeting: Poznan, Poland, Jul. 24-29, 2005, pp. 1-23.

Richardson, Iain, "H.264 and MPEG-4 Video Compression: Video Coding for Next Generation," Moscow: Tekhnosfera, 2005, pp. 261-269 (pp. 201-207 of translation).

http://iphome.hhi.de/suehring/tml/download/ on the Internet.

ISO/IEC-13818-2, "Information technology—Generic coding of moving pictures and associated audio information: Video", pp. 77-85, May, 1996.

ITU-T H.264 ITU-T Rec. H.264, "Advanced video coding for generic audiovisual services", pp. 146-149, Mar. 2005.

Adachi, S., et al., CAVLC Cleanup to Accommodate ABT including Field Scans Joint Video Team (JVT) of ISO/IEC MPEG & ITU-T VCEG (ISO/IEC JTC1/SC29/WG11 and ITU-T SG16 Q.6), 5th Meeting, Geneva, Switzerland, Oct. 9-17, 2002, pp. 1-4, XP002339408.

Lu, Xiaoan, et al., "Fast Mode Decision and Motion Estimation for H.264 with a Focus on MPEG-2/H.264 Transcoding," Conference Proceedings, IEEE International Symposium on Circuits and Systems (ISCAS), May 23, 2005, pp. 1246-1249.

Wiegand, Thomas, et al., "Overview of the H.264/AVC Video Coding Standard," IEEE Transactions on Circuits and Systems for Video Technology, vol. 13, No. 7, Jul. 2003, pp. 560-576.

Fujita, Gen, et al., "Real-time Processing Method for H.264 CABAC Using low Clock Frequency," IEICE Technical Report, The Institute of Electronics, Information and Communication Engineers, vol. 106, No. 116, Jun. 16, 2006, pp. 19-23.

* cited by examiner

| FIGURE TYPE | PARAMETER |
|---|---|
| CIRCLE | NONE |
| ELLIPSE | aa: SUM OF DISTANCES FROM TWO FOCAL POINTS |
| RECTANGLE | bb: LENGTH OF SIDE |
| LINE SEGMENT | NONE |

MOTION VECTOR SEARCH METHOD AND APPARATUS, PROGRAM THEREFOR, AND STORAGE MEDIUM WHICH STORES THE PROGRAM

TECHNICAL FIELD

The present invention relates to a motion vector search method used in video encoding which performs motion-compensated prediction and a corresponding apparatus, and a motion vector search program for implementing the motion vector search method and a computer-readable storage medium which stores the program.

Priority is claimed on Japanese Patent Application No. 2007-064286, filed Mar. 14, 2007, the contents of which are incorporated herein by reference.

BACKGROUND ART

In a video encoding method which performs motion-compensated prediction, a motion vector should be searched for. In the motion vector search, the encoding efficiency is not always maximum at the position which produces the minimum power for prediction error. This is because transmitted actual encoding information includes, not only a prediction error signal, but also vector information or the like.

Accordingly, a motion vector search is performed in consideration of the amount of generated code for the motion vector as an overhead cost. In a reference software in H.264, the cost function "Cost=D+λ·R" is used when selecting the prediction mode (see, for example, Non-Patent Document 1).

In the above formula, D indicates power for prediction error, R indicates the amount of generated code for data except for orthogonal transformation coefficients, and λ is a constant determined by the quantization step size.

By employing the above method, a motion vector which requires a minimum cost can be searched for in consideration of the amount of code generated for the motion vector.

The amount of code generated for the motion vector varies depending on the video encoding method.

For example, in a general rule of MPEG-2, difference between a motion vector of a target block and a motion vector (as a predicted vector) of a block on the left side of the target block is encoded (see Non-Patent Document 2).

Additionally, in H.264, such a difference is encoded using a predicted vector which is a median of motion vectors of three blocks around the target block (see Non-Patent Document 3).

As described above, when a motion vector is commonly used in video encoding systems having different costs required for the motion vector, the motion vector which has been searched for in a first video encoding system does not always provide a minimum cost in a second video encoding system.

As an example of using, in a second stage, a motion vector (called "original motion vector") which was used in a first stage, FIGS. 8A and 8B show a video encoding processing using another motion search method, or FIGS. 9A and 9B show a re-encoding processing.

In the former example, an encoding apparatus is formed using a motion search part or the like of another video encoding system. In the second example, an already-encoded bit stream is re-encoded so as to change the video encoding method, the bit rate, and the like.

In particular, in re-encoding, a motion vector used in the original bit stream can be used again so as to reduce the computation cost required for motion search in the re-encoding. For example, in the invention disclosed in Non-Patent Document 1, re-search is performed using the original motion vector which defines the search starting point.

In both examples, the cost is not guaranteed to be minimum in the second stage only when the original motion vector is directly used. Therefore, the encoding efficiency is degraded in comparison with a case of performing re-search for a wide area.

In particular, for the re-encoding case, in contrast that a video signal for which an original motion vector is searched for is an original signal, a decoded signal of the original bit stream is input into the second stage, that is, the target video signal is different between the first and second stages, so that the encoding efficiency probably degrades.

Therefore, in a generally employed method, only a peripheral area around the original motion vector is re-searched within a limit defined by the computation cost for the second stage. In this method, re-search is partially applied to a limited target area, thereby suppressing degradation in the encoding efficiency.

FIG. 10 is a flowchart of the above-described re-search.

As the amount of code generated for the motion vector is considered as an overhead cost, a predicted vector is computed before the re-search. However, for the research for the motion vector, only a peripheral area around the original motion vector is searched regardless of the predicted vector.

In accordance with the above method, it is possible to prevent the encoding efficiency from degrading while reducing the computation cost required for the re-search in the second stage.

Non-Patent Document 1: http://iphome.hhi.de/suehring/tml/download/ on the Internet.
Non-Patent Document 2: ISO/WC-13818-2, "Information technology—Generic coding of moving pictures and associated audio information: Video", pp. 77-85, May, 1996.
Non-Patent Document 3: ITU-T H.264 ITU-T Rec. H.264, "Advanced video coding for generic audiovisual services", pp. 146-149, March, 2005.
Patent Document 1: Japanese Unexamined Patent Application, First Publication No. 2000-244921.

DISCLOSURE OF INVENTION

Problem to be Solved by the Invention

However, if a cost function used for the search for the original motion vector differs from a cost function used in the second stage, an optimum motion vector is not always present in the vicinity of the original motion vector.

FIG. 11 shows an example of the above. The example shows a motion vector having a minimum cost in the re-search area (in the vicinity of the original motion vector) on the second stage, and another motion vector which is present outside the re-search area and has a cost lower than the above minimum cost.

Such a situation is caused by a condition in that no predicted vector on the second stage is considered when the first stage performs a motion search. Additionally, in the re-encoding method, as the input video signal is different between the first and second stages, such an offset between the relevant motion vectors may increase.

As described above, if the relevant cost function or video signal is different between a first stager for searching for an original motion vector and a second stage for re-searching a motion vector, the encoding efficiency may degrade. In order to solve this problem, the re-search area must be extended.

However, in such a case, another problem such as an increase in the computation cost on the second stage occurs.

In light of the above circumstances, an object of the present invention is to provide a novel vector search technique by which when an original motion vector obtained in a first video encoding system is used for searching for a motion vector in a second video encoding system, degradation in the encoding efficiency can be suppressed, and the computation cost can be reduced.

Means for Solving the Problem

In order to achieve the object, the present invention provides a motion vector search apparatus used in video encoding which performs motion-compensated prediction, the apparatus comprising: (1) an input device that inputs a motion vector which has been searched for with respect to an encoding target block; (2) a computation device that computes a motion vector having a minimum overhead cost which minimizes the amount of code generated for the motion vector of the encoding target block; (3) a limiting device that limits a search area based on the motion vector input by the input device and the motion vector which is computed by the computation device and has the minimum overhead cost; and (4) a search device that searches for a motion vector by searching only the search area limited by the limiting device.

The motion vector search method of the present invention implemented by operating the above-described devices can also be implemented by a computer program. Such a computer program may be provided by storing it in an appropriate computer-readable storage medium, or by means of a network, and can be installed and operate on a control device such as a CPU so as to implement the present invention.

In the motion vector search apparatus having the above structure in the present invention, when searching for a target motion vector, a motion vector (the above-described original motion vector) searched for in a previous video encoding system is input into the apparatus.

Next, a motion vector having a minimum overhead cost which minimizes the amount of code generated for the motion vector of the encoding target block is computed.

For example, a predicted vector of the encoding target block is computed based on a motion vector of an already-encoded block in the vicinity of the encoding target block, and the computed predicted vector is set as the motion vector having a minimum overhead cost.

Next, an area interposed between the input motion vector and the computed motion vector having the minimum overhead cost is specified, and the specified area is determined to be the limited search area.

For example, a circular area having a radius which corresponds to a line segment between the input motion vector and the computed motion vector having the minimum overhead cost is specified, and the specified area is determined to be the limited search area.

In another example, an area corresponding to a line segment between the input motion vector and the computed motion vector having the minimum overhead cost is specified, and the specified area is determined to be the limited search area.

In another example, a rectangular area having a side which corresponds to a line segment between the input motion vector and the computed motion vector having the minimum overhead cost is specified, where another side of the rectangular area has a predetermined length and perpendicularly intersects the line segment at the midpoint of said other side. The specified area is then determined to be the limited search area.

In another example, an elliptic area having focal points which correspond to the input motion vector and the computed motion vector having the minimum overhead cost is specified, where the sum of distances from the focal points are predetermined as a constant. The specified area is then determined to be the limited search area.

Next, typically, a motion vector is searched for by extracting search points within the limited search area, and searching only the extracted search points.

Effect of the Invention

As described above, when an original motion vector obtained in a first video encoding system is used for searching for a motion vector in a second video encoding system, the relevant cost function or video signal may be different between the first and second video encoding systems, and thus an optimum motion vector is not always present in the vicinity of the original motion vector. The present invention considering the above does not employ a method of re-searching only a peripheral area around the original motion vector, but limits the search area in a manner such that the search area includes the original motion vector and another point having a minimum overhead cost in the second video encoding system.

Therefore, in accordance with the present invention, it is possible to suppress degradation in the encoding efficiency, and the number of search points can be reduced. Therefore, the computation cost can be reduced.

Figure 1:
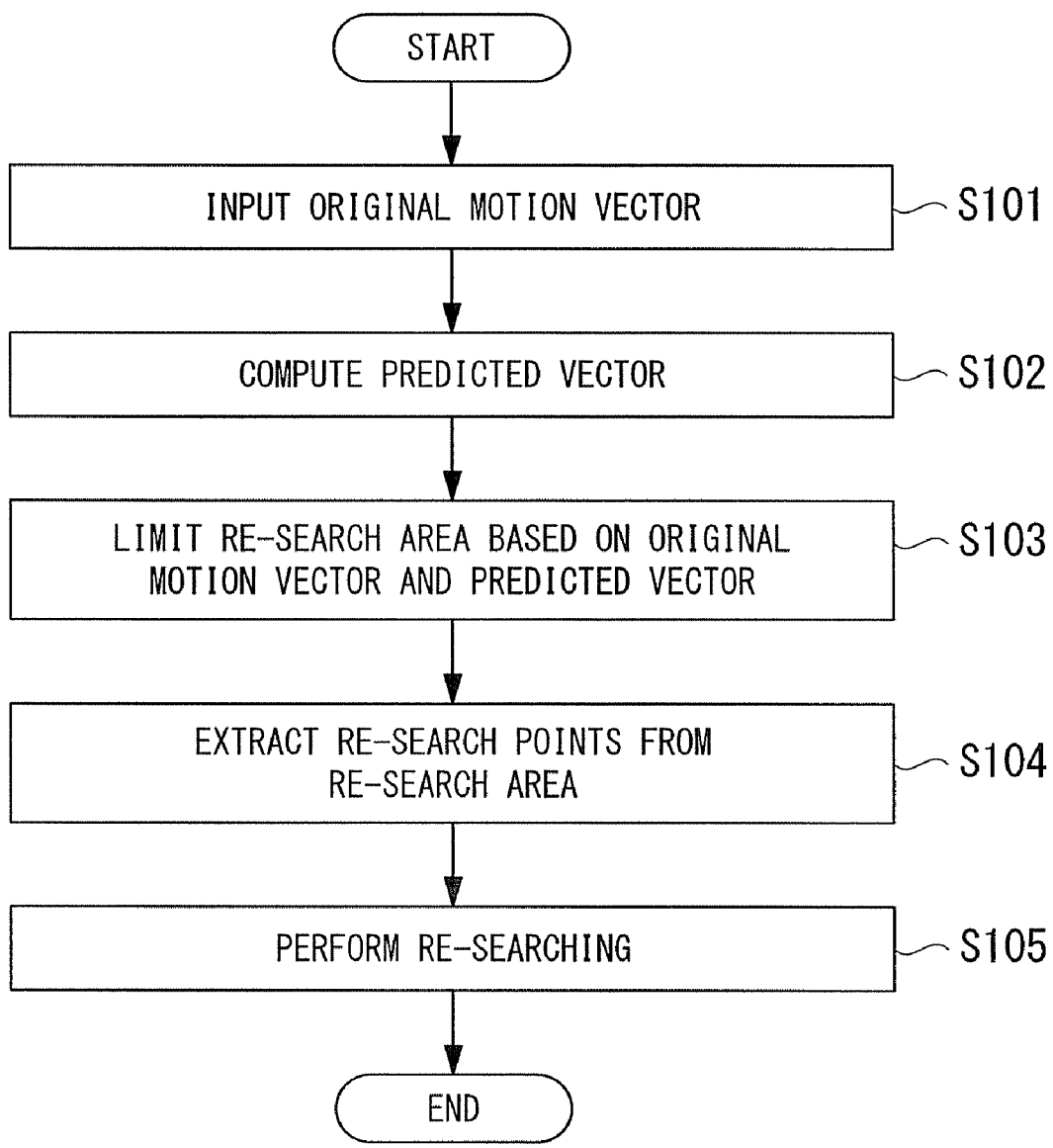
FIG. 1 is a flowchart showing an example operation in accordance with the present invention.

REFERENCE SYMBOLS 1 video encoding apparatus
10 motion search unit
20 re-search area limiter 200 predicted vector input unit
201 original motion vector input unit
202 figure type information input unit
203 re-search area setting unit
204 figure parameter storage unit

BEST MODE FOR CARRYING OUT THE
INVENTION

Below, the present invention will be explained in accordance with embodiments.

Problems in the conventional techniques, which occur when an original motion vector obtained in a first video encoding system is used for searching for a motion vector in a second video encoding system, are caused by a condition in that the motion vector is searched for only in the vicinity of the original motion vector.

For motion vector information, a predicted vector for an encoding target block is computed based on a motion vector of an already-encoded block in the vicinity of the target block, and a difference between the relevant motion vector and the predicted vector is encoded. Therefore, if the difference is zero, the motion vector has the minimum amount of code. That is, the predicted vector in the above case is the motion vector which produces the minimum overhead cost.

Accordingly, if an area in the vicinity of the original motion vector and an area in the vicinity of the predicted vector can be searched using a limited number of search points, the problems in the conventional techniques can be solved, thereby suppressing degradation in the encoding efficiency and reducing the computation cost.

Therefore, the present invention employs a structure for limiting a re-search area (or range) in the second encoding system by using an original motion vector and a predicted vector which produces a minimum amount of code (i.e., overhead cost) generated for a motion vector in the second video encoding system.

FIG. 1 is a flowchart showing an example operation in accordance with the present invention.

As shown in the flowchart, in the first step S101, an original motion vector, which was obtained in a first video encoding system, is input into the present system.

In the next step S102, a predicted vector of an encoding target block is computed using a motion vector of an already-encoded block in the vicinity of the target block.

The method for computing the predicted vector is determined depending on the video encoding system. In addition, a process performed when the already-encoded block has no motion vector due to an intraframe encoding mode or the like is also determined depending on the predicted vector generating method of each video encoding system.

In the next step S103, the re-search area is limited based on the original motion vector and the predicted vector.

In the next step S104, for the limited re-search area, search points included in a figure which represents the re-search area, are extracted.

For example, if the re-search area has a circular form, all search points included in the relevant circle are extracted so as to determine the re-search area. When the number of search points in the re-search area coincides with the number of re-search points determined by a conventional method, the computation cost in the second motion search unit is equal between the present and conventional methods. If the number of search points is reduced in comparison with the conventional method, the computation cost can be reduced.

In the next step S105, a motion vector is determined by performing re-searching with respect to the extracted re-search points.

Next, the method of limiting the re-search area based on the original motion vector and the predicted vector will be explained.

When limiting (i.e., setting) the re-search area, it is preferable that a predicted vector, which is a motion vector for providing a minimum overhead cost, is included in the area.

FIGS. 2A to 2D show examples of the set re-search area. In the examples, circular, elliptic, rectangular, and line-segment re-search areas are shown. The method of limiting each re-search area will be explained below.

(1) Circular Form

Figure 2B:
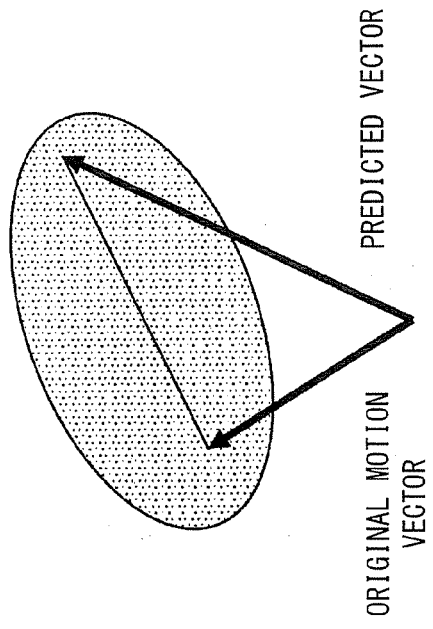
FIG. 2B is also a diagram explaining a re-search area limited in accordance with the present invention.
Figure 2D:
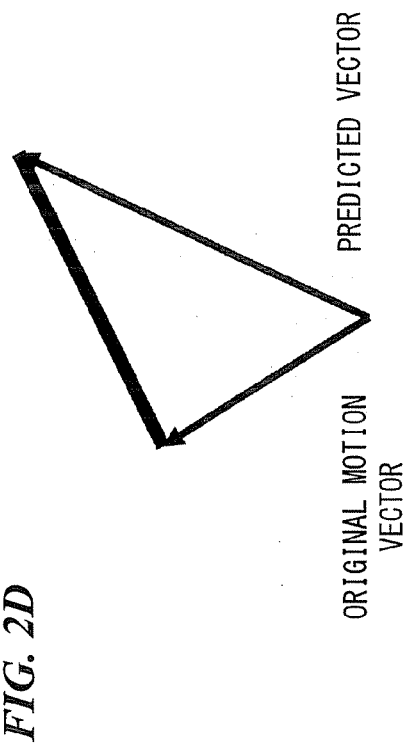
FIG. 2D is also a diagram explaining a re-search area limited in accordance with the present invention.
Figure 2A:
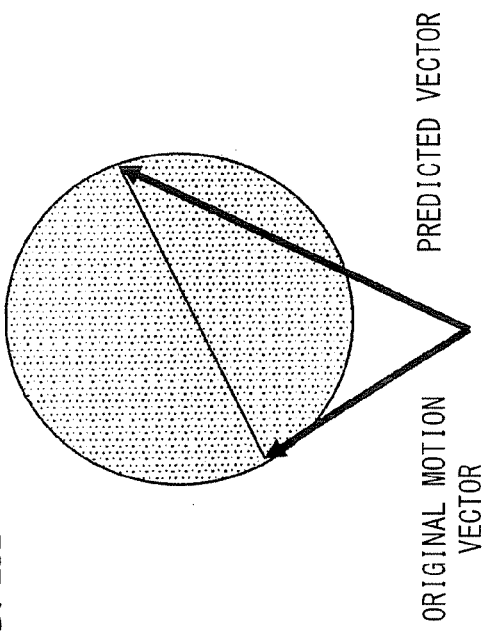
FIG. 2A is a diagram explaining a re-search area limited in accordance with the present invention.

As shown in FIG. 2A, a circle having a radius which corresponds to a line segment between the original motion vector and the predicted vector may be drawn, so that search points included in the circle are extracted to determine the re-search area.

(2) Elliptic Form

As shown in FIG. 2B, an ellipse having focal points which correspond to the original motion vector and the predicted vector may be drawn, where the sum of distances from the focal points are predetermined as a constant, and search points included in the ellipse are extracted to determine the re-search area.

(3) Rectangular Form

Figure 2C:
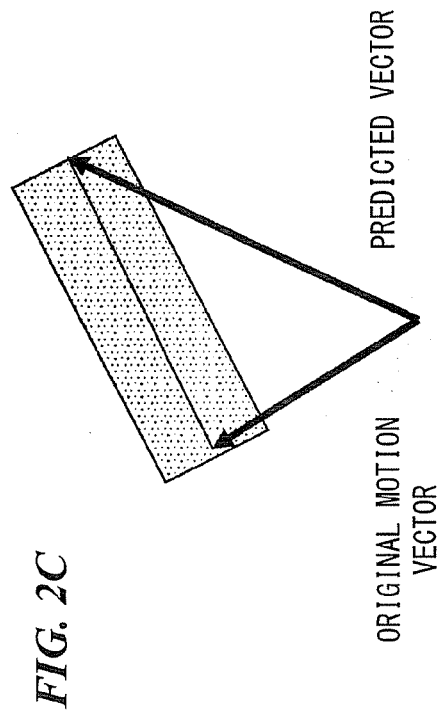
FIG. 2C is also a diagram explaining a re-search area limited in accordance with the present invention.

As shown in FIG. 2C, a rectangle having longer sides which correspond to the distance between the original motion vector and the predicted vector may be drawn, where the length of the shorter sides is predetermined as a constant, and search points included in the rectangle are extracted to determine the re-search area.

(4) Line-Segment Form

As shown in FIG. 2D, a line segment which connects the original motion vector and the predicted vector to each other may be drawn, so that search points on the line segment are extracted to determine the re-search area.

The above methods for limiting the re-search area are examples, and the re-search area is limited mainly based on the original motion vector and the predicted vector.

In a video encoding system using a plurality of block sizes for motion compensation, the number of motion vectors is determined depending on the block size, and thus the maximum block size may always provide a minimum overhead cost. In such a case, a motion vector for a minimum overhead cost may be computed for each block size.

For example, if there are two block sizes such as 16×16 and 8×8, a motion vector corresponding to a minimum overhead cost is computed and the re-search area is determined for each size.

In accordance with the above-described methods based on the present invention, when an original motion vector obtained in a first video encoding system is used for searching for a motion vector in a second video encoding system, an area in the vicinity of the predicted vector can also be searched without increasing the number of re-search points. Therefore, it is possible to prevent the encoding efficiency from degrading, and also to reduce the computation cost.

Specific Embodiment

Below, the present invention will be further explained in accordance with a specific embodiment.

Figure 3:
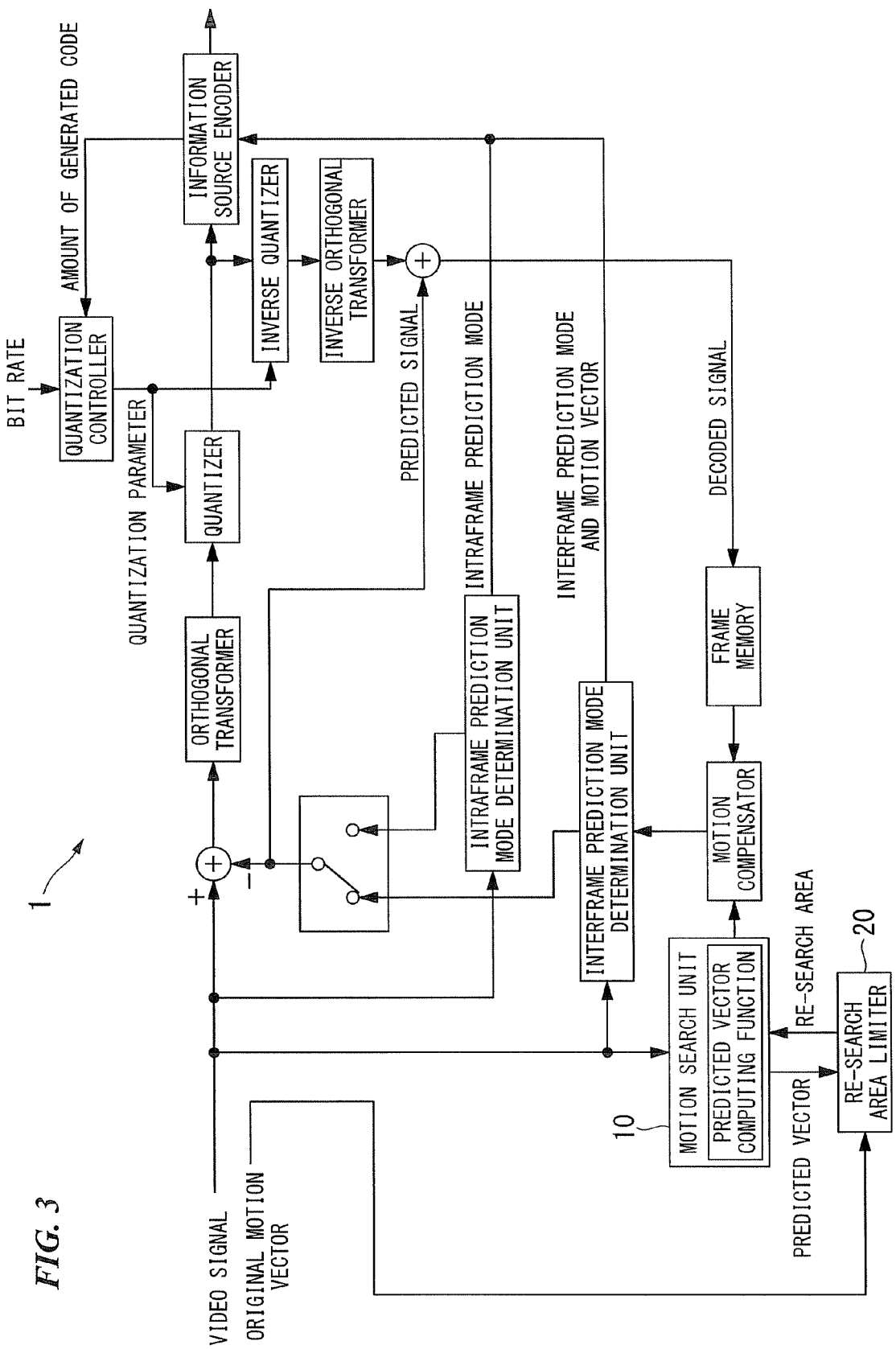
FIG. 3 is a diagram showing a structure of a video encoding apparatus to which the present invention is applied.

FIG. 3 shows a structure of a video encoding apparatus to which the present invention is applied.

As shown in FIG. 3, the video encoding apparatus 1 performs an operation of generating a predicted signal of a target video signal, computing a difference between the video signal and the predicted signal, and generating and outputting an encoded bit stream by quantizing and encoding the difference. The apparatus has a function of computing a predicted vector of an encoding target block based on a motion vector of an already-encoded block in the vicinity of the target block, and has a motion search unit 10 for searching for a motion vector. The apparatus also has a re-search area limiter 20, into which an original motion vector obtained in a previous video encoding system and a predicted vector computed by the motion search unit 10 are input. The re-search area limiter 20 instructs a re-search area (region) of a target motion vector to the motion search unit 10.

Figure 4:
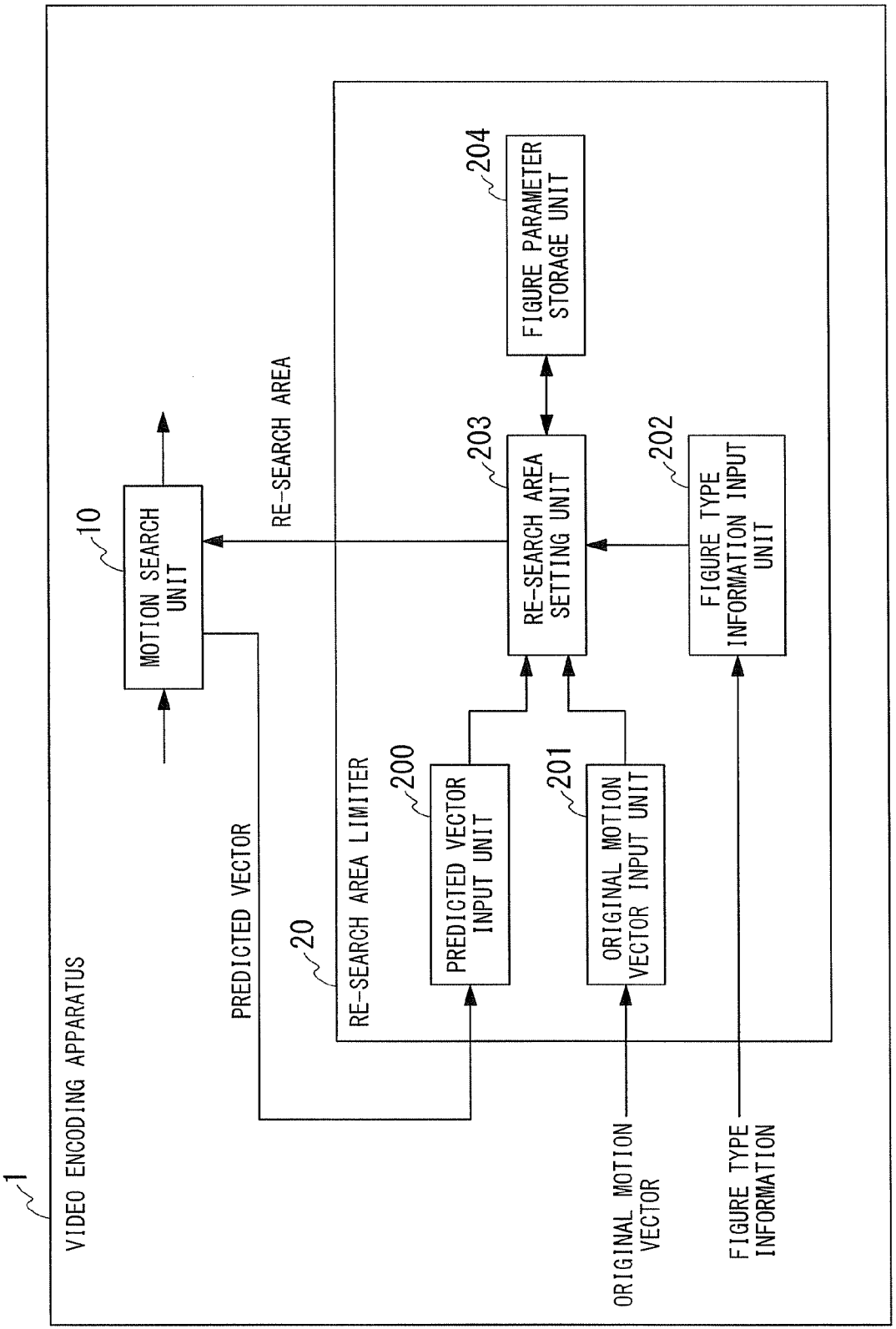
FIG. 4 is a diagram showing an example inner structure of the video encoding apparatus.

FIG. 4 shows an example structure of the re-search area limiter 20 in the video encoding apparatus 1, so as to implement the motion vector search process of the present embodiment.

As shown in FIG. 4, the re-search area limiter 20 has a predicted vector input unit 200, an original motion vector input unit 201, a figure type information input unit 202, a re-search area setting unit 203, and a figure parameter storage unit 204.

A predicted vector computed by the motion search unit 10 is input by the predicted vector input unit 200 into the re-search area limiter 20. An original motion vector obtained in the previous video encoding system is input by the original motion vector input unit 201 into the re-search area limiter 20.

Figure type information which indicates a predetermined circular, elliptic, rectangular, or line-segment form of the re-search area is input by the figure type information input unit 202 into the re-search area limiter 20.

The re-search area setting unit 203 sets a re-search area for a motion vector based on the predicted vector input by the predicted vector input unit 200, the original motion vector input by the original motion vector input unit 201, and the figure type information input by the figure type information input unit 202, and communicates the set re-search area to the motion search unit 10.

Figures 5, 6:
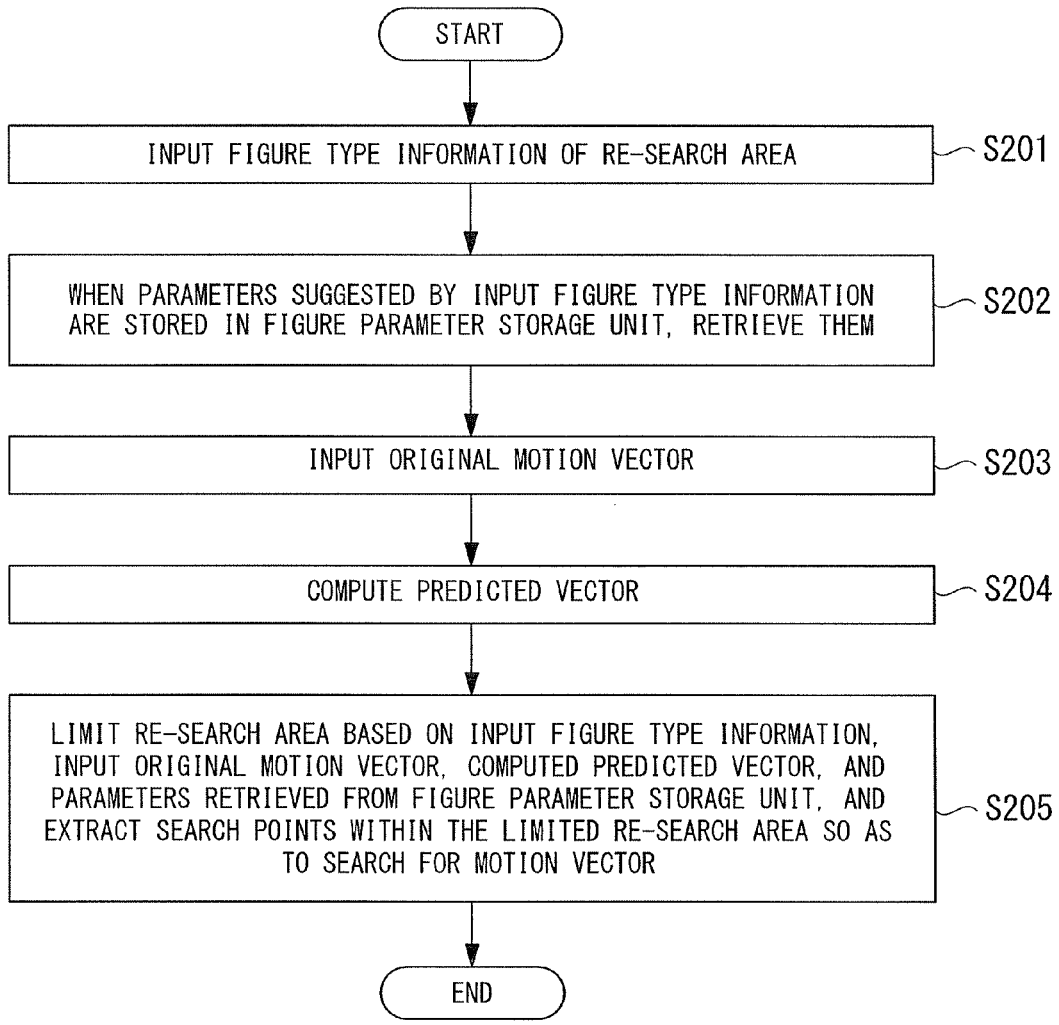
FIG. 5 is a diagram explaining the data structure of a figure parameter storage unit.
FIG. 6 shows an example flowchart performed by the video encoding apparatus.

The figure parameter storage unit 204 has a data structure as shown in FIG. 5, and stores information of figure parameters which are used when the re-search area setting unit 203 sets the re-search area.

For example, as explained by referring to FIG. 2B, an ellipse figure type needs a set value for the sum of the distances from two focal points so as to set the re-search area, and thus information of the set value is stored.

In addition, as explained by referring to FIG. 2C, a rectangle figure type needs a set value for the length of the other sides so as to set the re-search area, and thus information of the set value is stored.

In the present embodiment, re-encoding of a bit stream encoded in another video encoding system is a precondition, and a motion vector extracted from an original bit stream is used as the input original motion vector.

In addition, the predicted vector is computed using three blocks in the vicinity of the target block.

Furthermore, the original bit stream has already been decoded before the encoding on the second (present) stage, and the relevant motion vector has been stored.

FIG. 6 shows an example flowchart performed by the video encoding apparatus 1 having the structure of FIG. 4.

In accordance with the flowchart, the motion vector search process performed by the video encoding apparatus 1 will be explained in detail.

As shown in the flowchart of FIG. 6, in the video encoding apparatus 1, inputting of predetermined figure type information for the re-search area is performed (see the first step S201).

In the next step S202, when parameters suggested by the input figure type information are stored in the figure parameter storage unit 204, they are retrieved.

If figure type information is assigned to the entire video sequence, the process from step S201 to S202 should be executed only once for the video sequence.

In the next step S203, a motion vector is extracted from the original bit stream, so as to perform inputting of the original motion vector required for the encoding target block.

In the next step S204, a predicted vector of the encoding target block is computed based on the motion vector of an already-encoded block in the vicinity of the target block.

For example, when the median of motion vectors (<MVA>, <MVB>, and <MVC>) of three blocks in the vicinity of the encoding target block is computed as the predicted vector, the predicted vector <PMV> is computed by the following formulas:

$$PMV_x = \text{Median}(MVA_x, MVB_x, MVC_x)$$

$$PMV_y = \text{Median}(MVA_y, MVB_y, MVC_y)$$

where <...> indicates a vector.

In the next step S205, the re-search area for the relevant motion vector is limited as shown in FIGS. 2A to 2D, based on the input figure type information, the input original motion vector, the computed predicted vector, and the parameters retrieved from the figure parameter storage unit 204. The search points are extracted within the limited re-search area, so as to search for the relevant motion vector.

Next, referring to a flowchart in FIG. 7, the process executed in step S205 in the flowchart of FIG. 6 will be explained in detail for a specific example in which "line segment" is suggested as the figure type for the re-search area.

Figure 7:
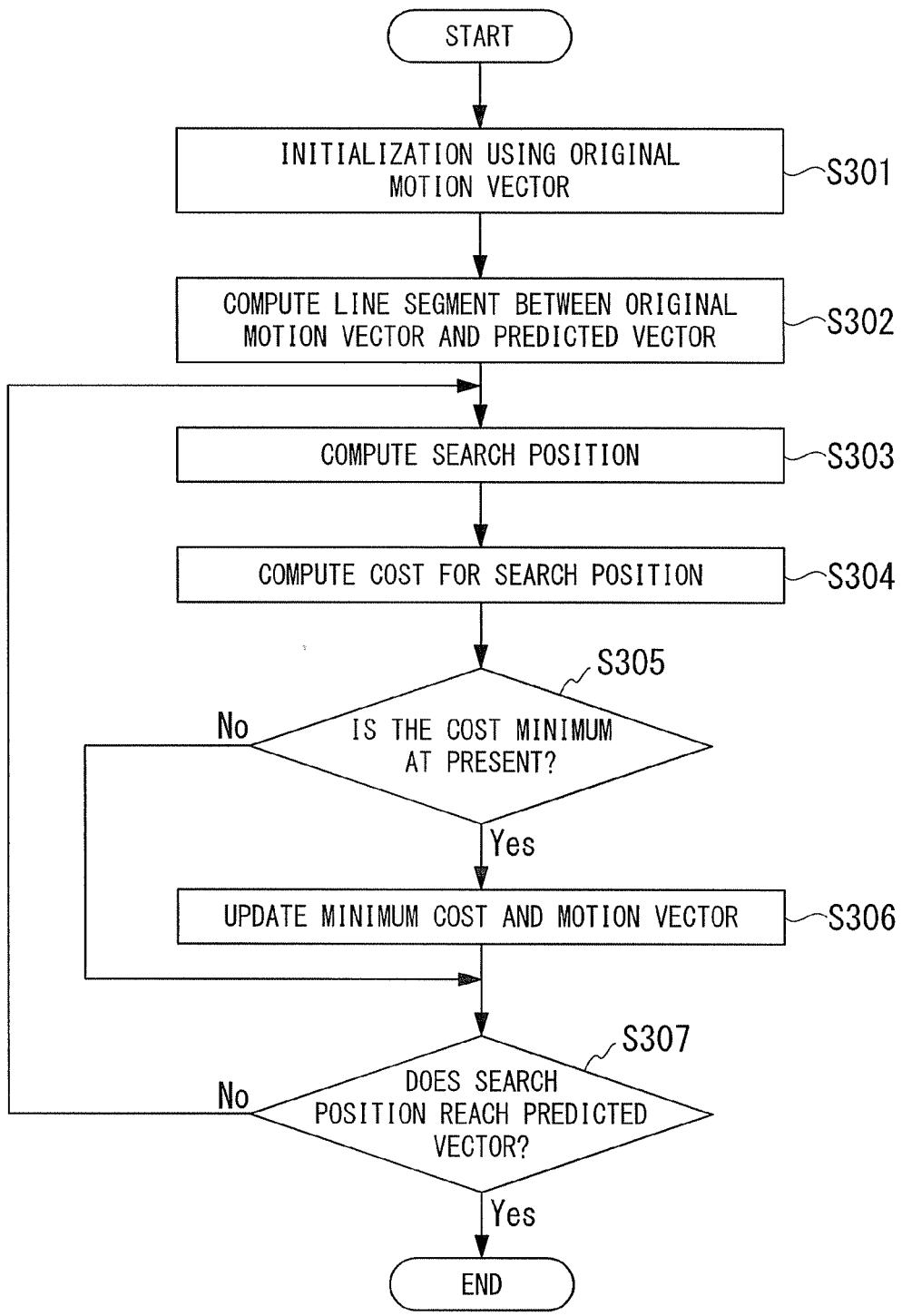
FIG. 7 also shows an example flowchart performed by the video encoding apparatus.
Figure 8A:
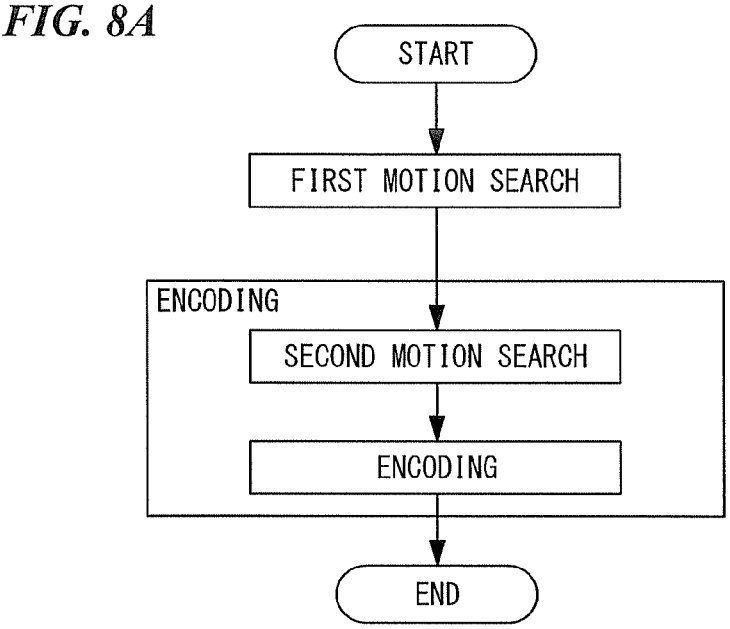
FIG. 8A is a diagram explaining an example process of using, in a second stage, a motion vector which was used in a first stage.
Figure 8B:
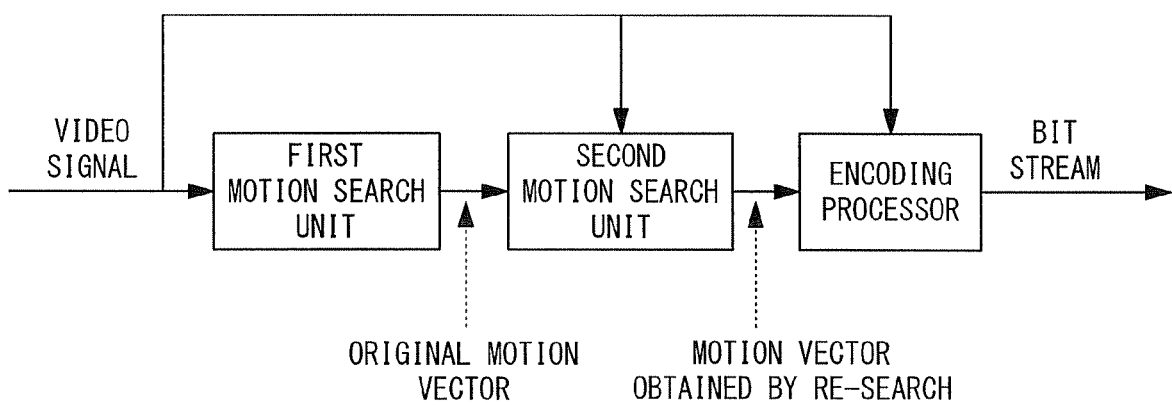
FIG. 8B is also a diagram explaining the above example.
Figure 9A:
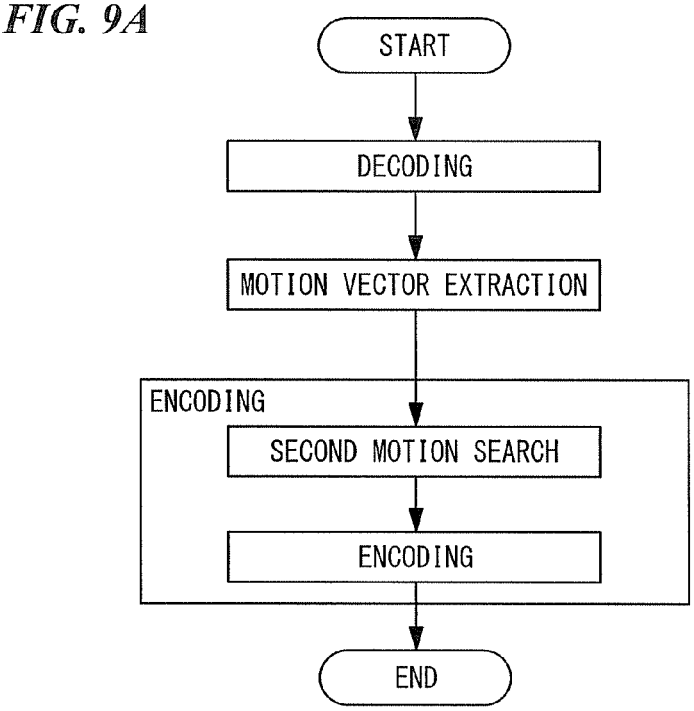
FIG. 9A is a diagram explaining another example process of using, in a second stage, a motion vector which was used in a first stage.
Figure 9B:
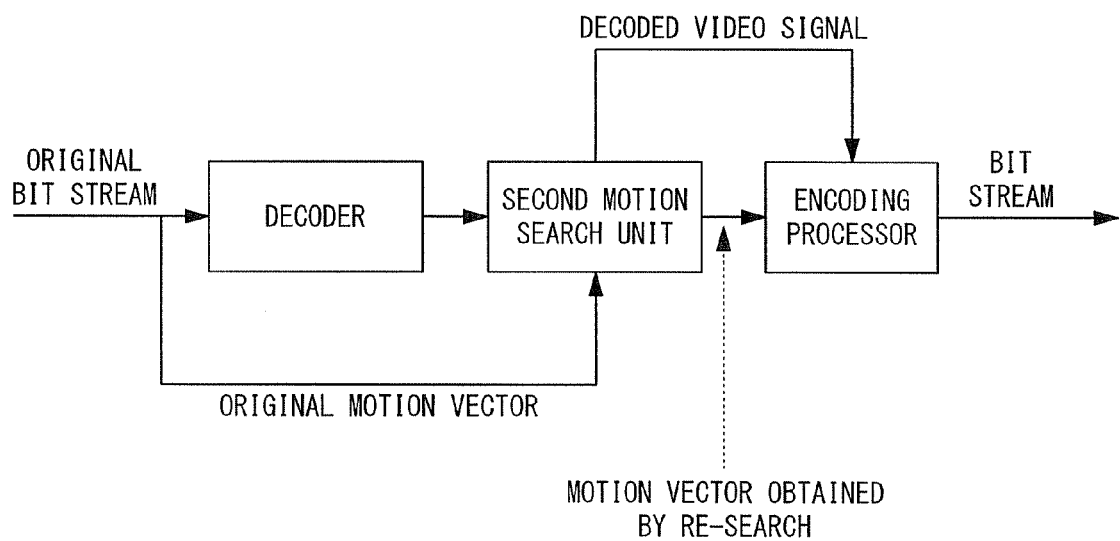
FIG. 9B is also a diagram explaining the above other example.
Figure 10:
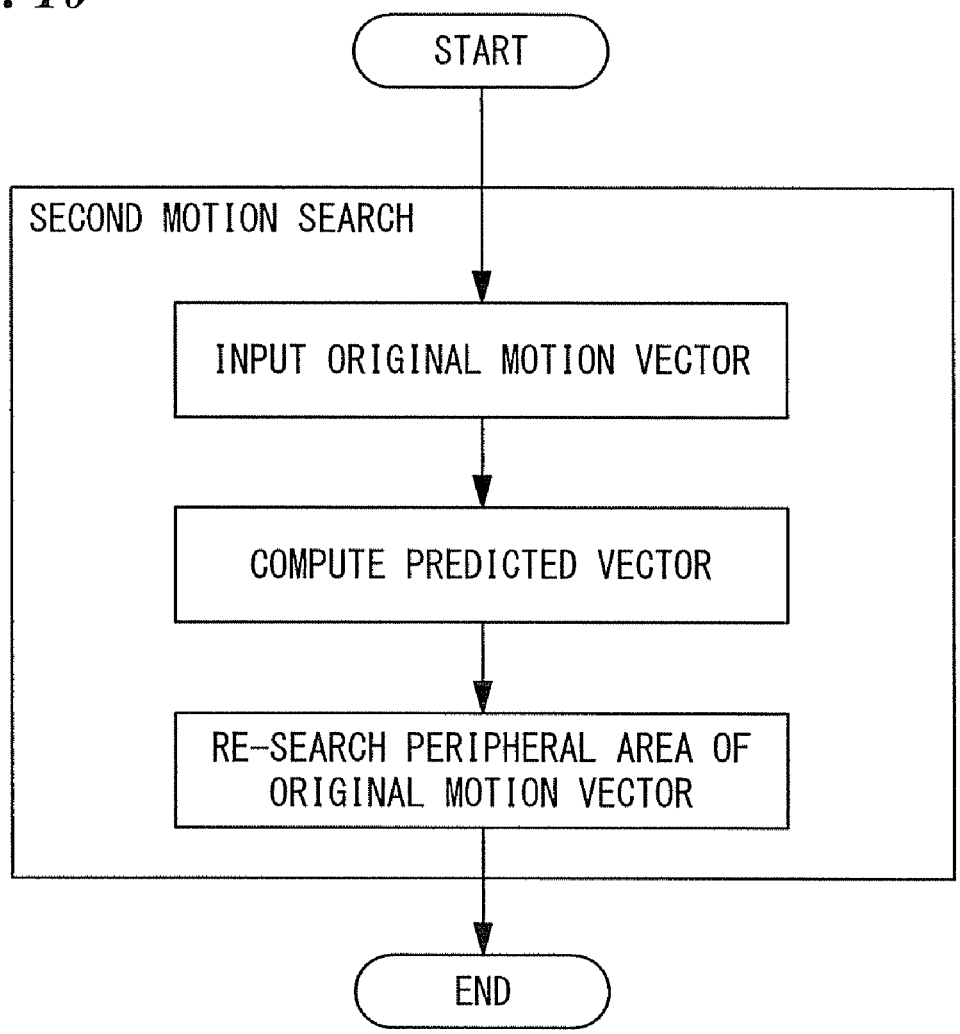
FIG. 10 is a flowchart relating to a conventional technique.
Figure 11:
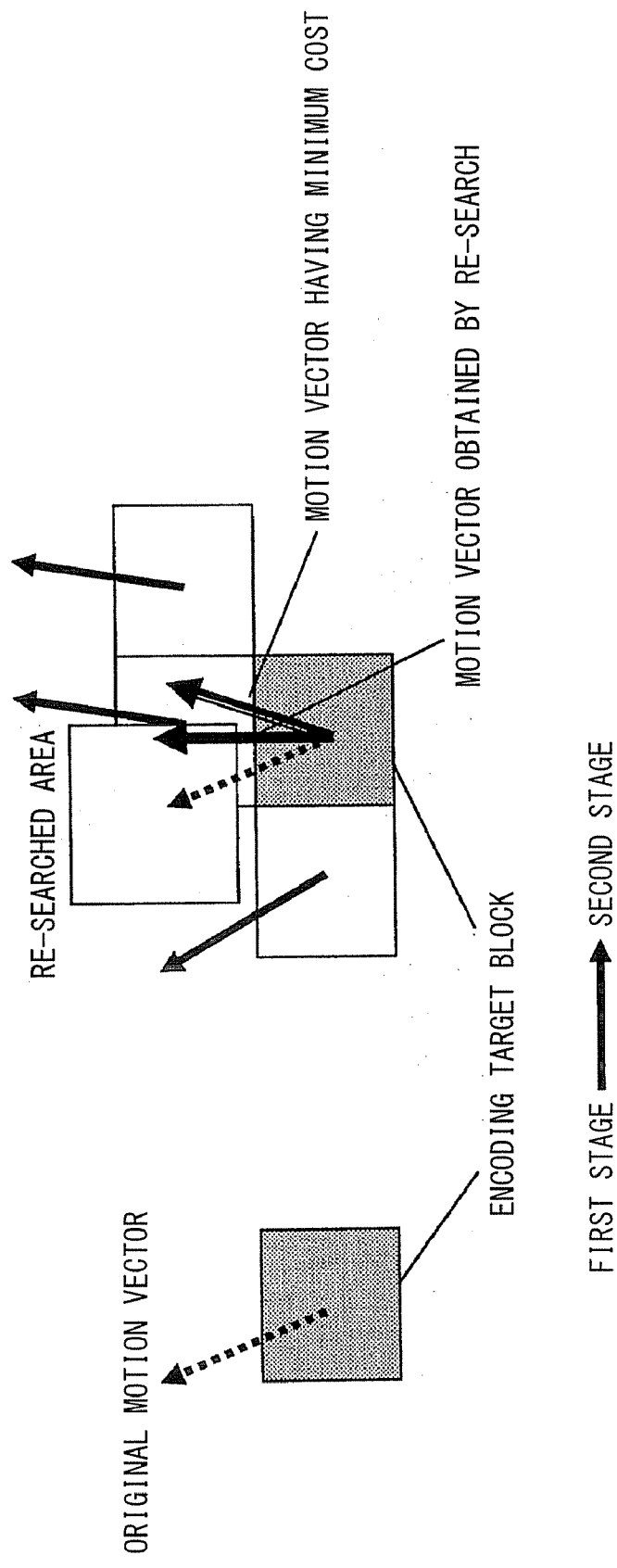
FIG. 11 is a diagram explaining a problem in the conventional technique.

In the flowchart of FIG. 7, it is assumed that the search points are set with an integer pixel accuracy, and that searching starts from the original motion vector, proceeds horizontally or vertically on the line segment by each pixel, and ends at the position of the predicted vector.

That is, if "line segment" is designated as the figure type for the re-search area, then in the process of step S205 (see the flowchart of FIG. 7), initialization using the original motion vector is performed (see the first step S301), so that the input original motion vector <MVO> is set as an initial motion vector, and the cost required for the original motion vector <MVO> is set as a minimum cost.

In the next step S302, a line segment "y=αx+β" defined between the original motion vector <MVO> and the predicted vector <PMV> is computed.

That is, the gradient α and the intercept β of the line segment are computed by the following formulas:

$$\alpha = (PMV_y - MVO_y)/(PMV_x - MVO_x)$$

$$\beta = MVO_y - \alpha \cdot MVO_x$$

where the case that "$PMV_x = MVO_x$" is excluded.

In the next step S303, if the absolute value |α| of the computed gradient is greater than or equal to 1, the vertical component is varied by 1. If the absolute value |α| is smaller than 1, the horizontal component is varied by 1. By using the varied horizontal or vertical component, the other component is computed by means of the relevant formula for the line segment, thereby computing a search position set on the line segment "y=αx+β". Here, if "$PMV_x = MVO_x$", only the vertical component is varied.

In the next step S304, the cost required for the search position is computed. In the next step S305, the computed cost is compared with the presently-determined minimum cost.

In accordance with the above comparison, when it is determined that the computed cost is lower than the presently-determined minimum cost, the operation proceeds to step S306, where the minimum cost and the motion vector are updated based on the currently-computed cost and motion vector.

In the next step S307, it is determined whether or not the search position coincides with the predicted vector. If it is determined that they do not coincide with each other, the operation returns to step S303, and if it is determined that they coincide with each other, the operation is completed.

In the flowchart of FIG. 7, the start and end points of searching are respectively assigned to the original motion vector and the predicted vector. However, the order of searching is not limited. For example, cost comparison may be performed at three points such as the center and both ends of the re-search area, so as to reduce the number of search points.

When employing such a method, for example, three points defined by the original motion vector, the predicted vector, and the midpoint of both vectors are compared so as to extract two points having lower costs than the remaining point. However, if both end points are extracted as having lower costs, the point having the lowest cost and the midpoint are extracted. Then the midpoint between the extracted two points is computed, and similar comparison between three points is performed. Such operation is repeated until no midpoint can be extracted.

In addition, searching may start from a position having a relatively low cost.

The flowchart of FIG. 7 shows the process executed in step S205 in the flowchart of FIG. 6, where it is assumed that "line segment" is designated as the figure type of the re-search area. However, a similar operation is performed when a figure type (of re-search area) other than "line segment" is designated.

That is, each search position is sequentially selected within the re-search area limited as shown in FIGS. 2A to 2C, and the cost required for the position is computed. If it is determined that the computed cost is lower than the presently-determined minimum cost, the minimum cost and motion vector are updated based on the currently-computed cost and motion vector. The motion vector which provides the minimum cost is searched for by repeating such an operation.

As described above, in the present invention, when performing re-encoding, the re-search area for motion search on the second encoding stage can be limited based on the motion vector of the original bit stream and the relevant predicted vector.

Although the present invention has been explained in accordance with the specific embodiment together with the drawings, the present invention is not limited thereto. For example, instead of the specific embodiment having the figure type information input unit 202 by which a figure type for the re-search area can be designated from an external device, the figure type information input unit 202 may be omitted and the figure type for the re-search area may be predetermined.

Additionally, instead of the specific embodiment in which the original bit stream is already-decoded, a decoding process may be performed on the present stage. Furthermore, the specific embodiment performs a re-encoding process. However, encoding on the second stage is possible when the original motion vector and a video signal can be input into the second stage. Therefore, encoding using the video signal may be performed while the first stage may function as a motion search unit.

INDUSTRIAL APPLICABILITY

In accordance with the present invention, it is possible to suppress degradation in the encoding efficiency, and the number of search points can be reduced. Therefore, the computation cost can be reduced.

The invention claimed is:

1. A motion vector search method used in video encoding which performs motion-compensated prediction, the method comprising the steps of:
   inputting a motion vector which has been searched for with respect to an encoding target block;
   computing a motion vector having a minimum overhead cost which minimizes the amount of code generated for the motion vector of the encoding target block;
   limiting a search area by specifying an area interposed between the input motion vector and the computed motion vector having the minimum overhead cost, and determining the specified area to be the limited search area, in a manner such that the search area becomes larger as the distance between both vectors increases and the search area becomes smaller as said distance decreases; and
   searching for a motion vector by searching only the limited search area, wherein:
   the step of limiting a search area includes specifying a circular area having a radius which corresponds to a line segment between the input motion vector and the computed motion vector having the minimum overhead cost, and determining the specified area to be the limited search area; and
   the encoding target block includes a start point of both the two motion vectors, and the start point of two motion vectors is outside of the search area.

2. A motion vector search apparatus having devices for performing the steps in the motion vector search method in accordance with claim 1.

3. A motion vector search method used in video encoding which performs motion-compensated prediction, the method comprising the steps of:
   inputting a motion vector which has been searched for with respect to an encoding target block;
   computing a motion vector having a minimum overhead cost which minimizes the amount of code generated for the motion vector of the encoding target block;
   limiting a search area by specifying an area interposed between the input motion vector and the computed motion vector having the minimum overhead cost, and determining the specified area to be the limited search area, in a manner such that the search area becomes larger as the distance between both vectors increases and the search area becomes smaller as said distance decreases; and
   searching for a motion vector by searching only the limited search area, wherein:
   the step of limiting a search area includes specifying an area corresponding to a line segment between the input motion vector and the computed motion vector having the minimum overhead cost, and determining the specified area to be the limited search area; and
   the encoding target block includes a start point of both the two motion vectors, and the start point of two motion vectors is outside of the search area.

4. A motion vector search apparatus having devices for performing the steps in the motion vector search method in accordance with claim 3.

5. A motion vector search method used in video encoding which performs motion-compensated prediction, the method comprising the steps of:
   inputting a motion vector which has been searched for with respect to an encoding target block;
   computing a motion vector having a minimum overhead cost which minimizes the amount of code generated for the motion vector of the encoding target block;
   limiting a search area by specifying an area interposed between the input motion vector and the computed motion vector having the minimum overhead cost, and determining the specified area to be the limited search area, in a manner such that the search area becomes larger as the distance between both vectors increases and the search area becomes smaller as said distance decreases; and
   searching for a motion vector by searching only the limited search area, wherein:
   the step of limiting a search area includes:
   specifying a rectangular area having a side which corresponds to a line segment between the input motion vector and the computed motion vector having the minimum overhead cost, where another side of the rectangular area has a predetermined length and perpendicularly intersects the line segment at the midpoint of said other side; and
   determining the specified area to be the limited search area.

6. A motion vector search apparatus having devices for performing the steps in the motion vector search method in accordance with claim 5.

7. A motion vector search method used in video encoding which performs motion-compensated prediction, the method comprising the steps of:
   inputting a motion vector which has been searched for with respect to an encoding target block;
   computing a motion vector having a minimum overhead cost which minimizes the amount of code generated for the motion vector of the encoding target block;
   limiting a search area by specifying an area interposed between the input motion vector and the computed motion vector having the minimum overhead cost, and determining the specified area to be the limited search area, in a manner such that the search area becomes larger as the distance between both vectors increases and the search area becomes smaller as said distance decreases; and
   searching for a motion vector by searching only the limited search area, wherein:
   the step of limiting a search area includes:
   specifying an elliptic area having focal points which correspond to the input motion vector and the computed motion vector having the minimum overhead cost, where the sum of distances from the focal points are predetermined as a constant; and
   determining the specified area to be the limited search area.

8. A motion vector search apparatus having devices for performing the steps in the motion vector search method in accordance with claim 7.

9. A non-transitory computer-readable storage medium which stores a motion vector search program by which a computer executes an operation for implementing the motion vector search method in accordance with any of claims 1, 3, 5, or 7.

* * * * *